United States Patent
Sausset et al.

(10) Patent No.: US 9,494,196 B2
(45) Date of Patent: Nov. 15, 2016

(54) BEARING DEVICE, A SENSOR-BEARING UNIT AND AN APPARATUS COMPRISING AT LEAST ONE SUCH BEARING DEVICE

(75) Inventors: Vincent Sausset, Azay le Rideau (FR); Sylvain Chaussat, Tours (FR)

(73) Assignee: Aktiebolaget SKF, Göteberg (SE)

( * ) Notice: Subject to any disclaimer, the term of this patent is extended or adjusted under 35 U.S.C. 154(b) by 47 days.

(21) Appl. No.: 14/411,505

(22) PCT Filed: Jul. 5, 2012

(86) PCT No.: PCT/IB2012/001442
§ 371 (c)(1),
(2), (4) Date: Mar. 30, 2015

(87) PCT Pub. No.: WO2014/006436
PCT Pub. Date: Jan. 9, 2014

(65) Prior Publication Data
US 2015/0204385 A1    Jul. 23, 2015

(51) Int. Cl.
*F16C 41/00* (2006.01)
*G01P 3/44* (2006.01)
*F16C 19/06* (2006.01)

(52) U.S. Cl.
CPC .............. *F16C 41/007* (2013.01); *G01P 3/443* (2013.01); *F16C 19/06* (2013.01)

(58) Field of Classification Search
CPC .................................................... F16C 41/007
USPC ............ 384/448; 324/207.15, 207.2, 207.22, 324/207.25
See application file for complete search history.

(56) References Cited

U.S. PATENT DOCUMENTS 5,642,042 A * 6/1997 Goossens .................. G01P 1/00
324/173

FOREIGN PATENT DOCUMENTS

| CN | 101398438 A | 4/2009 | |
|---|---|---|---|
| DE | 102011084260 A1 * | 4/2013 | ............ F16C 41/007 |
| FR | 2 884 367 A1 | 10/2006 | |
| JP | H01 156463 U | 10/1989 | |
| JP | 2005 024017 A | 1/2005 | |
| WO | 2012/063506 A1 | 5/2012 | |
| WO | 2012063506 A | 5/2012 | |

OTHER PUBLICATIONS

PCT/IB2012/001442, International Search Report, Mar. 21, 2013.

* cited by examiner

*Primary Examiner* — Phillip A Johnson
(74) *Attorney, Agent, or Firm* — Soquel Group LLC

(57) ABSTRACT

A bearing device, comprising a bearing including an inner ring and an outer ring centered on a central axis, an impulse ring including a target holder which is fixed to the inner ring and extends beyond the outer ring radially to the central axis, and a target which is fixed to the target holder beyond the outer ring and is adapted to cooperate with detection means for tracking the rotation of the impulse ring around the central axis, and shifting means for axially shifting the impulse ring relative to the outer ring; the shifting means are distinct from the target holder. A sensor-bearing unit and an apparatus comprising at least one such bearing device are also disclosed and claimed.

20 Claims, 5 Drawing Sheets

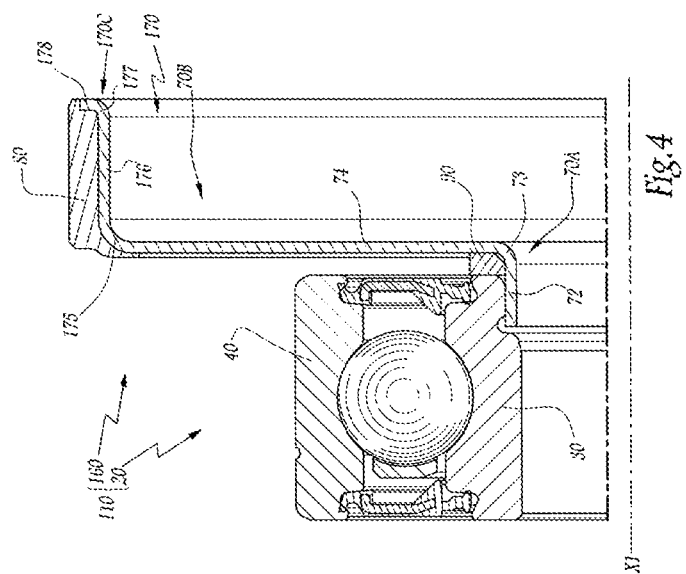
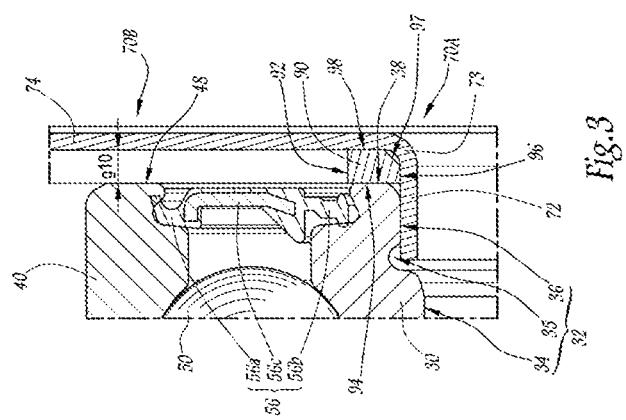

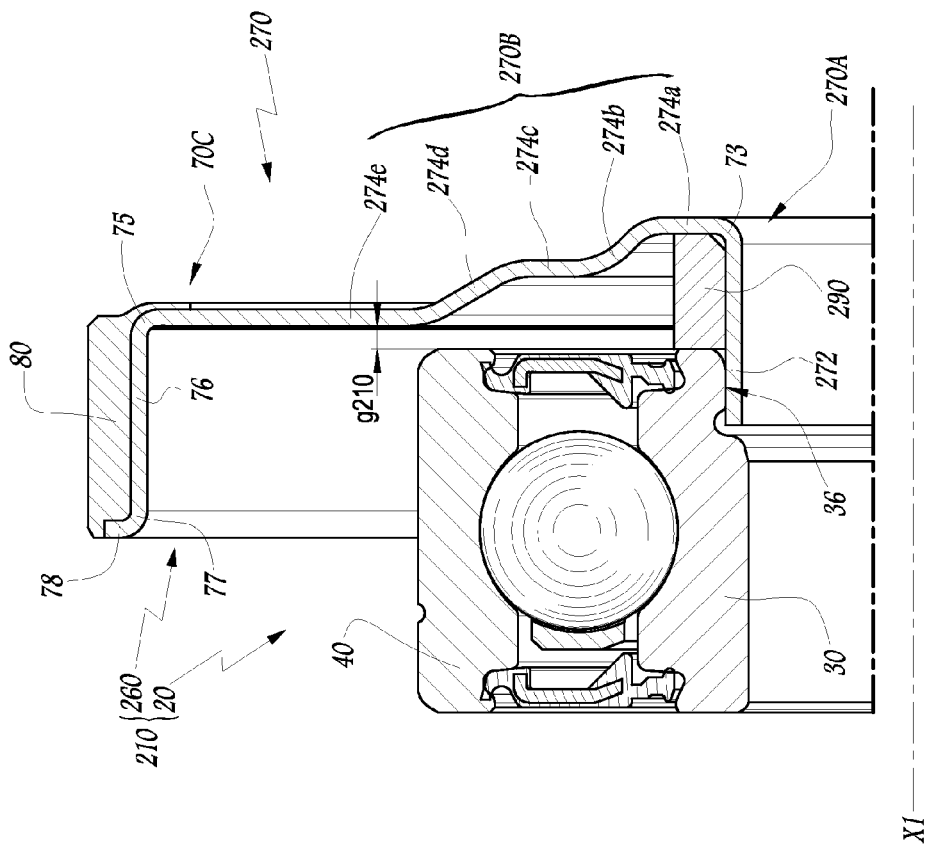
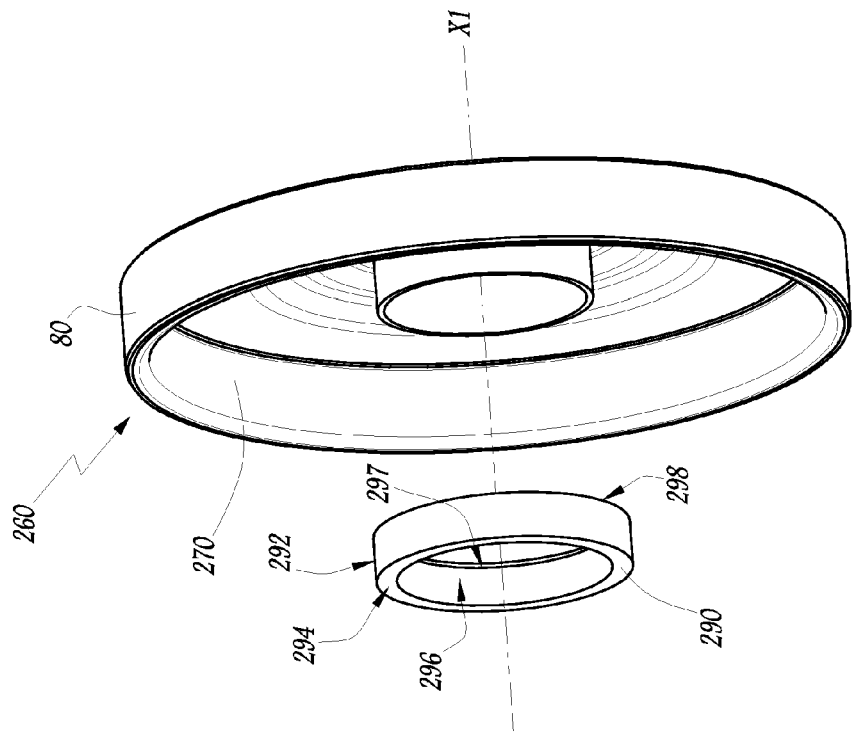
Fig.6
Fig.5

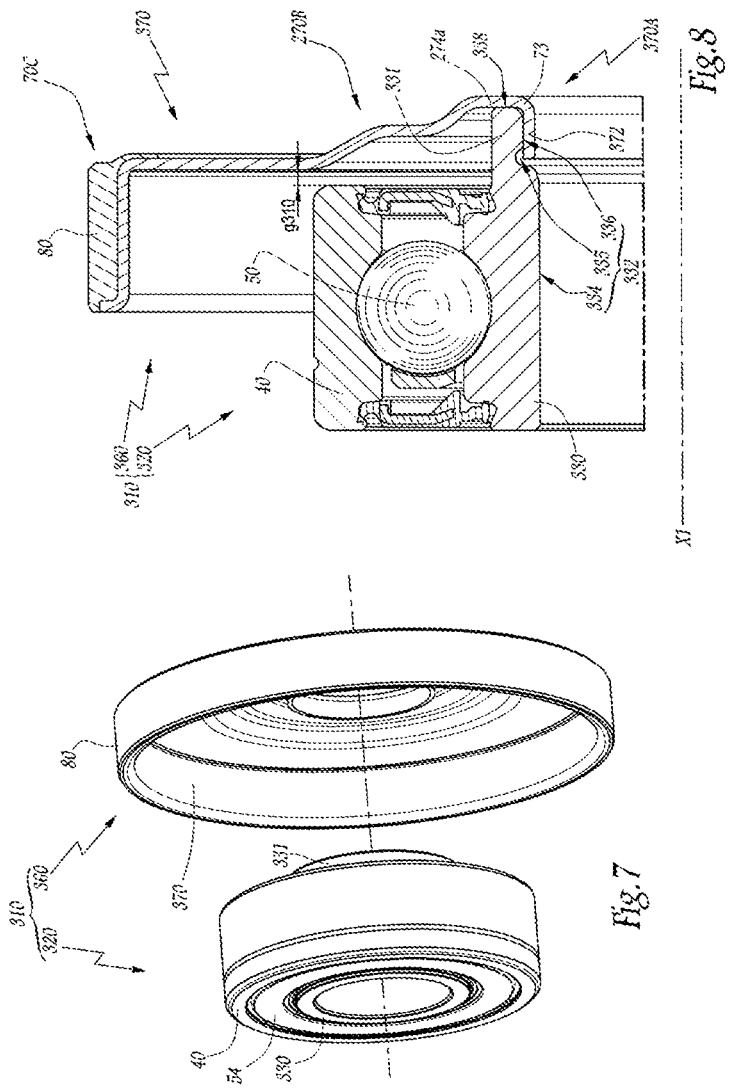

BEARING DEVICE, A SENSOR-BEARING UNIT AND AN APPARATUS COMPRISING AT LEAST ONE SUCH BEARING DEVICE

TECHNICAL FIELD OF THE INVENTION

The invention concerns a bearing device, comprising a bearing and an impulse ring. The invention also concerns a sensor-bearing unit and an apparatus comprising at least one such bearing device.

BACKGROUND OF THE INVENTION

Today, sensor-bearing units are commonly used in automotive, aeronautics and other technical fields. These units provide high quality signals and transmissions, while allowing integration in simpler and more compact apparatus.

Such a sensor-bearing unit generally comprises a bearing, an impulse ring and detection means facing impulse ring. This impulse ring may comprise a target holder and a target including alternating north and south poles, whose number depends on bearing size and particular application. With a bearing having suitable dimensions, impulse ring may be fixed to a rotating ring of this bearing, while detection means may be fixed to a non-rotating ring of this bearing.

With a bearing having small dimensions, it may be necessary to position the detection means beside the bearing, while impulse ring is fixed to inner ring and extends radially beyond outer ring of the bearing. Together, bearing and impulse ring forms a bearing device which can be fixed to a rotating shaft. However, when shaft, inner ring and impulse ring are rotating at high speed, a deformation of target holder may lead to interferences with outer ring, what must be avoided.

FR-A-2 884 367 describes such a sensor-bearing unit. The target holder has a specific shape and reinforcement ribs in order to avoid interferences with outer ring, but this increases the manufacturing complexity and cost of the impulse ring.

SUMMARY OF THE INVENTION

The aim of the invention is to provide a simpler bearing device.

To this end, the invention concerns a bearing device, comprising a bearing including an inner ring and an outer ring centered on a central axis; an impulse ring including a target holder which is fixed to the inner ring and extends beyond the outer ring radially to the central axis, and a target which is fixed to the target holder beyond the outer ring and is adapted to cooperate with detection means for tracking the rotation of the impulse ring around the central axis; and shifting means for axially shifting the impulse ring relative to the outer ring. This bearing device is characterized in that the shifting means are distinct from the target holder.

Thanks to the invention, interferences between stationary outer ring and rotating impulse ring can be avoided, while target holder still has a simple shape.

According to further aspects of the invention which are advantageous but not compulsory, such a bearing device may incorporate one or several of the following features:

The shifting means bear against the target holder near an inner portion of this target holder.
The shifting means are located on or against the inner ring and extend axially beyond the outer ring, at the opposite of the bearing, along the central axis.
The shifting means define an axial gap between the outer ring and an intermediate portion of the target holder along the central axis, the axial gap being preferably initially comprised between 2% and 4% of maximum outer diameter of the outer ring.
The shifting means comprise a washer located between the target holder and the inner ring.
The shifting means comprise a side portion of the inner ring.
An intermediate portion of the target holder comprises rigidifying means.
The bearing is a rolling bearing including rolling elements located between the inner ring and the outer ring.
At least one axial side of the bearing comprises sealing means located between the inner ring and the outer ring.
The target holder has an outer portion supporting the target and extending opposite the bearing.
The impulse ring is a magnetic impulse ring, with a magnetic target including magnetic poles.
The target of the impulse ring is a radial target.
The target of the impulse ring is an axial target.

The invention also concerns a sensor-bearing unit, comprising detection means and a bearing device as mentioned here-above.

The invention also concerns an apparatus, comprising a rotating shaft, detection means and at least one bearing device as mentioned here-above. The inner ring of the bearing is fixed on the rotating shaft and the detection means are associated with the impulse ring for tracking the rotation of the rotating shaft.

BRIEF DESCRIPTION OF THE DRAWINGS

The invention will now be explained in correspondence with the annexed figures, and as an illustrative example, without restricting the object of the invention. In the annexed figures:

FIG. 3 is a sectional view at a larger scale of detail III from FIG. 2;

FIG. 4 is a partial sectional view of a bearing device according to a second embodiment of the invention;

FIGS. 5 and 6 are views similar respectively to FIGS. 1 and 4 of a bearing device according to a third embodiment of the invention;

FIGS. 7 and 8 are views similar respectively to FIGS. 5 and 6 of a bearing device according to a fourth embodiment of the invention.

DETAILED DESCRIPTION OF SOME EMBODIMENTS

Figure 2:
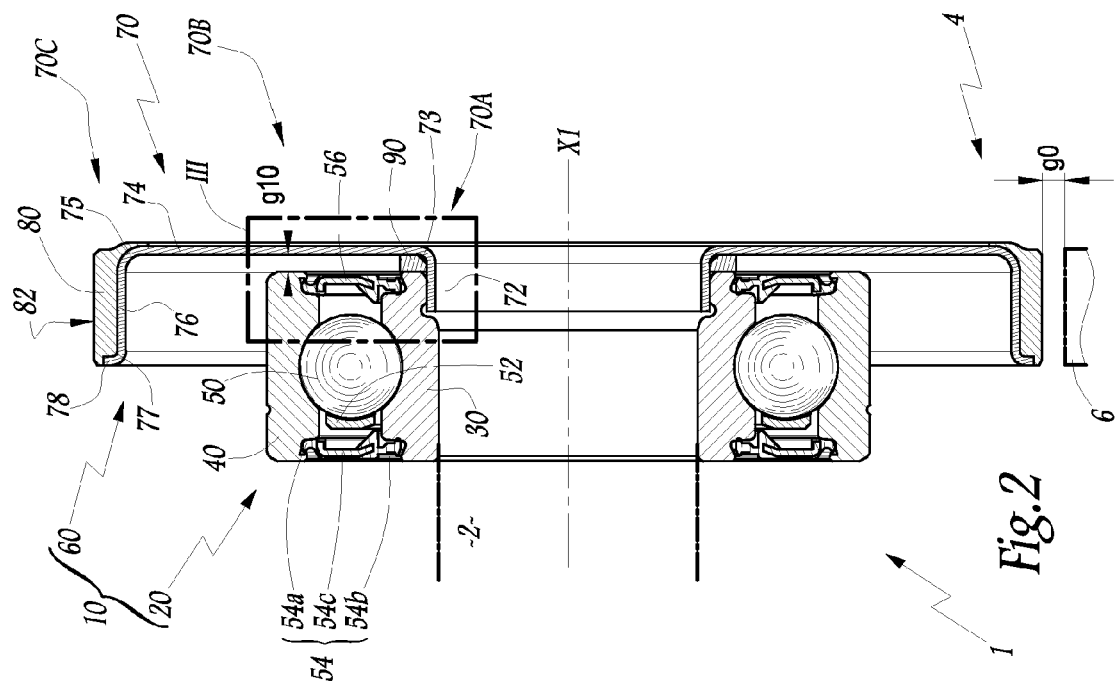
FIG. 2 is an axial sectional view of the bearing device of FIG. 1, equipping an apparatus according to the invention.
Figure 1:
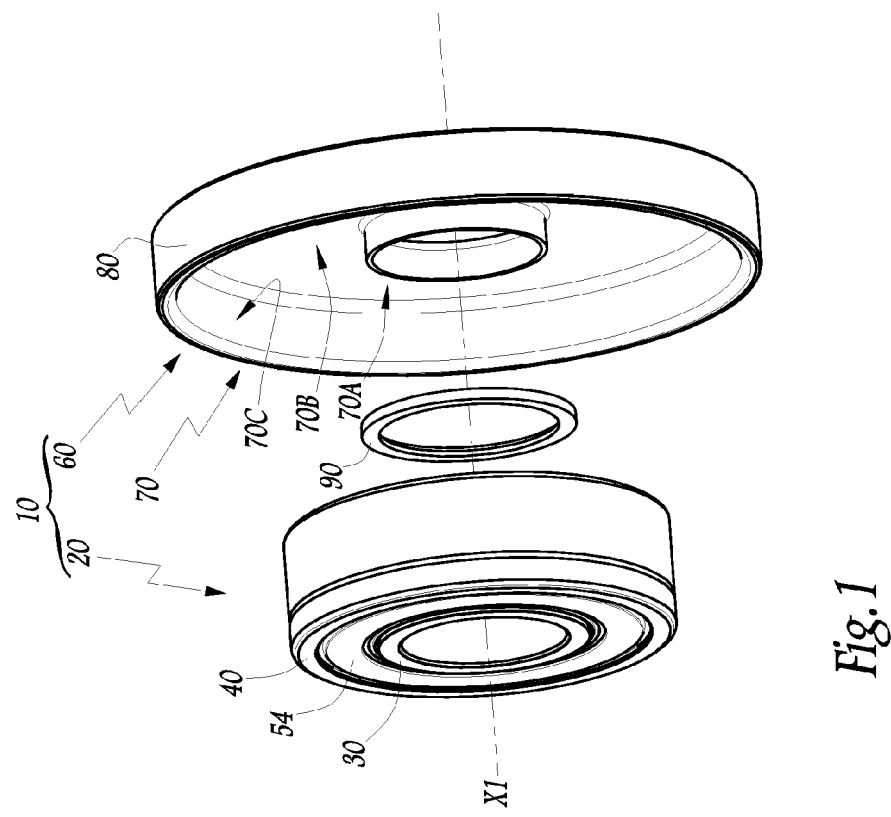
FIG. 1 is an exploded perspective view of a bearing device according to the invention.

The bearing device 10 according to the invention represented on FIGS. 1 to 3 is adapted to equip an apparatus 1, such a motor, a brake system, a suspension system or any rotating machine, in particular for an automotive vehicle.

The apparatus 1 is shown partially on FIG. 2. Apparatus 1 comprises a rotating shaft 2 and a sensor-bearing unit 4, which includes detection means 6 and the bearing device 10. Shaft 2 and bearing device 10 are centered on a central axis X1 of apparatus 1. Bearing device 10 comprises a bearing 20 mounted on shaft 2, a magnetic impulse ring 60 mounted on the bearing 20 and a washer 90 located between bearing 20 and impulse ring 60. Detection means 6 are associated with the impulse ring 60 for tracking the rotation of the rotating shaft 2.

The bearing 20 includes a rotating inner ring 30 and a stationary outer ring 40 centered on axis X1. Bearing 20 also comprises rolling elements 50 located between inner ring 30 and outer ring 40 and positioned in a bearing cage 52. The inner ring 30 has an inner portion 32 comprising a first cylindrical bore 34, a substantially annular groove 35 and a second cylindrical bore 36. With reference to central axis X1, diameter of bore 34 is smaller that diameter of bore 36. On the side of bearing 20 where impulse ring 60 is located, closer to bore 36 than to bore 34, rings 30 and 40 have annular lateral faces, respectively 38 and 48. Inner ring 30 is fixed on rotating shaft 2, which is fitted into bore 34. Outer ring 40 can be mounted in a support member not shown, belonging to apparatus 1.

Preferably, each axial side of bearing 20 comprises sealing means, respectively 54 and 56, located between inner ring 30 and outer ring 40. For example, sealing means 54 and 56 are rubber seals. Each seal 54 and 56 comprises a base 54a or 56a fixed on outer ring 40, a sealing lip 54b or 56b in contact with inner ring 30, and a rigid insert 54c or 56c located between base and lip. As an alternative, bearing 20 may comprise no sealing means. As another alternative, only one side of bearing 20 may comprise sealing means 54 or 56. As another alternative, sealing means 54 and/or 56 may have any suitable configuration.

The impulse ring 60 includes a target holder 70 and a target 80. Target holder 70 is fixed to inner ring 30 and extends beyond outer ring 40 radially to axis X1. Target 80 is fixed to target holder 70, beyond outer ring 40 radially to axis X1. Target 80 is a plastic molded part including magnetic poles, with an outer surface 82 facing detection means 6. Target 80 and detection means 6 cooperate for tracking the rotation of impulse ring 60, inner ring 30 and shaft 2 around central axis X1. A gap g0 is provided radially to axis X1 between surface 82 and detection means 6. In other words, target 80 of impulse ring 60 is a radial target.

The target holder 70 may be made of metal or plastic, formed by stamping or by any other suitable process. Going away from central axis X1, target holder 70 comprises an axial part 72, a curved part 73, a radial part 74, a curved part 75, an axial part 76, a curved part 77 and a radial part 78. Parts 72 and 76 extend parallel to axis X1, while parts 74 and 78 extend radially to axis X1. Parts 72 and 74 are linked by part 73, parts 74 and 76 are linked by part 75, while parts 76 and 78 are linked by part 77.

In other words, target holder 70 has an inner portion 70A including parts 72 and 73, an intermediate portion 70B including part 74 and an outer portion 70C including parts 75, 76, 77 and 78. Inner and outer portions 70A and 70C extend towards the bearing 20 relative to intermediate portion 70B. Part 72 of inner portion 70A is fitted in bore 36 of inner ring 30. Target 80 is fixed on outer portion 70C, located around outer ring 40.

As an alternative, impulse ring 60 may have an axial target, with a gap defined axially between target and detection means 6. In this case, outer portion 70C of target holder 70 has to be adapted.

As another alternative, detection means 6 and impulse ring 60 may use any other suitable technology instead of magnetic technology. For example, induction technology or optic technology may be implemented within sensor-bearing unit 4.

The washer or spacer 90 has a substantially annular shape centered on axis X1. Washer 90 comprises a cylindrical outer surface 92, an annular lateral surface 94, a cylindrical inner surface 96 and an annular lateral surface 98. Washer 90 also comprises a tapered chamfer 97 formed between surfaces 96 and 98. Washer 90 is located between inner ring 30 and target holder 70. More precisely, surface 94 bears against face 38 of inner ring 30, surface 98 bears against part 74 near inner portion 70A of target holder 70, surface 96 is fitted on axial part 72 and chamfer 97 is oriented towards curved part 73. As an alternative, a radial play may be provided between surface 96 and part 72.

As shown on FIGS. 2 and 3, when shaft 2 is not rotating around axis X1, part 74 of intermediate portion 70B extends substantially parallel to faces 38 and 48 of bearing 20. Washer 90 is located against inner ring 30 and extends axially beyond outer ring 40, at the opposite of bearing 20, along axis X1. A gap g10 is yet defined by washer 90, between face 48 of outer ring 40 and part 74 of intermediate portion 70B, along an axial direction parallel to axis X1. Preferably but not compulsorily, at this stage the axial gap g10 is comprised between 2% and 4% of maximum outer diameter of the outer ring 40. Thus, bearing device 10 has a reduced bulk along axis X1.

When shaft 2 is rotating at high speed, inner ring 30 and impulse ring 60 of bearing device 10 are also rotating at high speed around axis X1. This rotation can lead to a deformation of part 74 towards bearing 20. If part 74 was rubbing against outer ring 40, a critical dysfunction of bearing device 10 may occur.

Under those conditions, washer 90 forms spacing or shifting means for axially shifting impulse ring 60, more precisely intermediate part 70B of target holder 70, relative to the outer ring 40. According to the invention, these shifting means 90 are distinct from the configuration of target holder 70. Contrary to intermediate portion of target holder having a complex shape in prior art, the shape of target holder 70 equipping bearing 10 according to the invention is greatly simplified.

Other embodiments of the invention are shown on FIGS. 4 to 8. In these embodiments, elements identical to the first embodiment have the same references. Only the differences with respect to the first embodiment are described hereafter. Axis X1 is shown, even if offset from its actual position, on FIGS. 4, 6 and 8.

A second embodiment of a bearing device 110 according to the invention is represented on FIG. 4. Elements working in the same way but having a structure different from first embodiment have references increased by 100.

The bearing device 110 comprises the bearing 20, the washer 90 and an impulse ring 160, including the target 80 and a target holder 170. More precisely, target holder 170 has an outer portion 170C which is different from portion 70C, while having same portions 70A and 70B as target holder 70. Outer portion 170C includes parts 175, 176, 177 and 178. Outer portion 170C extends opposite the bearing 20 relative to portions 70A and 70B. Target 80 is fixed on outer portion 170C, which is not located around outer ring 40 in comparison with portion 70C. Thus, bearing device 110 is adapted to be incorporated into an apparatus 1 having a configuration different from that equipped with bearing device 10.

Figure 9:
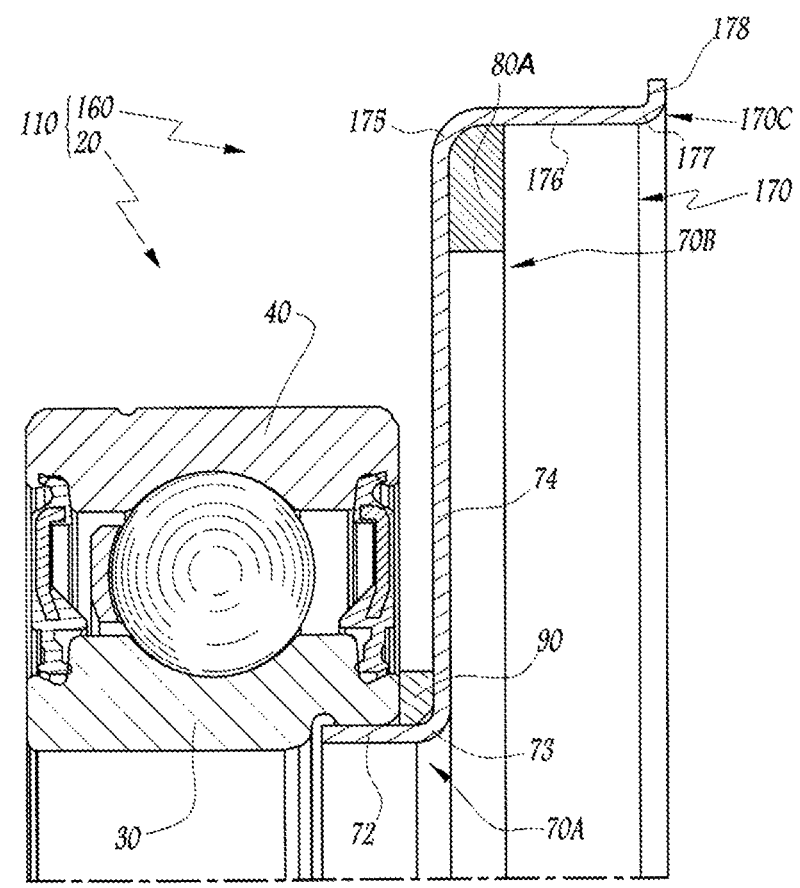
FIG. 9 is an alternative partial sectional view of a bearing device according to the second embodiment of the invention.

FIG. 9 depicts an alternative to the embodiment of FIG. 4, whereby impulse ring 160 has an axial target 80A, with a gap defined axially between target and detection means. In this case, outer portion 170C of target holder 170 has to be adapted.

A third embodiment of a bearing device 210 according to the invention is represented on FIGS. 5 and 6. Elements working in the same way but having a structure different from first embodiment have references increased by 200.

The bearing device 210 comprises the bearing 20 (not shown on FIG. 5 to simplify), a washer 290 and an impulse ring 260, including the target 80 and a target holder 270. More precisely, target holder 270 has an inner portion 270A and an intermediate portion 270B which are different from target holder 70, while having same outer portion 70C as target holder 70. The washer 290 is similar to washer 90 but is longer along axis X1. Consequently, part 272 of inner portion 270A is longer than part 72 along axis X1. Going away from axis X1, intermediate portion 270B includes a radial part 274a, a curved part 274b, a radial part 274c, an inclined part 274d and a radial part 274e which gradually approach bearing 20. A gap g210 is initially defined by washer 290, when shaft 2 is not rotating, between face 48 of outer ring 40 and part 274e of intermediate portion 270B, along an axial direction parallel to axis X1.

Thanks to their particular configuration, parts 274b, 274c and 274d form rigidifying means of intermediate portion 270B, in particular when shaft 2 is rotating. Alternatively, intermediate portion 270B may have any suitable rigidifying means for limiting its deformation when shaft 2 is rotating, while limiting global bulk and complexity of target holder 270.

A fourth embodiment of a bearing device 310 according to the invention is represented on FIGS. 7 and 8. Elements working in the same way but having a structure different from first embodiment have references increased by 300.

The bearing device 310 comprises a bearing 320 and an impulse ring 360, including the target 80 and a target holder 370. More precisely, target holder 370 has an inner portion 370A which is different from target holder 70, while having an intermediate portion 270B similar to target holder 270 and an outer portion 70C similar to target holder 70. The bearing device 310 also comprises shifting means which are formed directly by a lateral portion 331 of inner ring 330, not by a washer. In other words, this lateral portion 331 is located on inner ring 330 and extends axially beyond outer ring 40, opposite bearing 320, along axis X1. Inner ring 330 has an inner portion 332 comprising a first cylindrical bore 334, a substantially annular groove 335 and a second cylindrical bore 336. Along axis X1, part 372 of inner portion 370A is shorter than part 72, while bore 334 is longer than bore 34. A gap g310 is initially defined by portion 331, when shaft 2 is not rotating, between face 48 of outer ring 40 and part 274e of intermediate portion 270B, along an axial direction parallel to axis X1. Thus, bearing device 310 has a bulk similar to device 210 but includes no additional washer.

Other non-shown embodiments of the apparatus 1 and/or of the bearing device 10, 110, 210 or 310 can be implemented without leaving the scope of the invention.

In addition, technical features of the different embodiments can be, in whole or part, combined with each other. Thus, the apparatus 1 and the bearing device 10, 110, 210 or 310 can be adapted in terms of cost or to any specific requirements of the application.

The invention claimed is:

1. A bearing device, comprising:
   a bearing including an inner ring and an outer ring centered on a central axis;
   an impulse ring including:
      a target holder which is fixed to the inner ring and extends beyond the outer ring radially to the central axis, and
      a target which is fixed to the target holder beyond the outer ring and is adapted to cooperate with detection means for tracking the rotation of the impulse ring around the central axis; and
   shifting means, distinct from the target holder, for axially shifting the impulse ring relative to the outer ring, the shifting means being located on or against the inner ring and extending axially beyond the outer ring opposite the bearing, along the central axis.

2. The bearing device according to claim 1, wherein the shifting means bear against the target holder near an inner portion of the target holder.

3. The bearing device according to claim 1, wherein the shifting means comprise a side portion of the inner ring.

4. The bearing device according to claim 1, wherein an intermediate portion of the target holder comprises rigidifying parts.

5. A bearing device, comprising:
   a bearing including an inner ring and an outer ring centered on a central axis;
   an impulse ring including:
      a target holder which is fixed to the inner ring and extends beyond the outer ring radially to the central axis, and
      a target which is fixed to the target holder beyond the outer ring and is adapted to cooperate with detection means for tracking the rotation of the impulse ring around the central axis; and
   shifting means, distinct from the target holder, for axially shifting the impulse ring relative to the outer ring, the shifting means defining an axial gap between the outer ring and an intermediate portion of the target holder along the central axis.

6. The bearing device according to claim 5, wherein the axial gap is initially comprised between 2% and 4% of maximum outer diameter of the outer ring.

7. The bearing device according to claim 5, wherein the shifting means bear against the target holder near an inner portion of the target holder.

8. The bearing device according to claim 5, wherein the shifting means comprise a side portion of the inner ring.

9. A bearing device, comprising:
   a bearing including an inner ring and an outer ring centered on a central axis;
   an impulse ring including:
      a target holder which is fixed to the inner ring and extends beyond the outer ring radially to the central axis, and
      a target which is fixed to the target holder beyond the outer ring and is adapted to cooperate with detection means for tracking the rotation of the impulse ring around the central axis; and
   shifting means, distinct from the target holder, for axially shifting the impulse ring relative to the outer ring, the shifting means comprising a washer located between the target holder and the inner ring.

10. The bearing device according to claim 9, wherein the shifting means bear against the target holder near an inner portion of the target holder.

11. The bearing device according to claim 9, wherein the shifting means comprise a side portion of the inner ring.

12. The bearing device according to claim 9, wherein an intermediate portion of the target holder comprises rigidifying parts.

13. The bearing device according to claim 9, wherein the bearing is a rolling bearing including rolling elements located between the inner ring and the outer ring.

14. The bearing device according to claim 9, wherein at least one axial side of the bearing comprises seals located between the inner ring and the outer ring.

15. The bearing device according to claim 9, wherein the target holder has an outer portion supporting the target and extending opposite the bearing.

16. The bearing device according to claim 9, wherein the impulse ring is a magnetic impulse ring, with a magnetic target including magnetic poles.

17. The bearing device according to claim 9, wherein the target of the impulse ring is a radial target.

18. The bearing device according to claim 9, wherein the target of the impulse ring is an axial target.

19. A sensor-bearing unit, comprising the detection means and the bearing device according to claim 9.

20. An apparatus, comprising a rotating shaft, the detection means and at least one bearing device according to claim 9, wherein the inner ring of the bearing is fixed on the rotating shaft and the detection means are associated with the impulse ring for tracking the rotation of the rotating shaft.

* * * * *